United States Patent
Kim et al.

(10) Patent No.: US 8,718,146 B2
(45) Date of Patent: May 6, 2014

(54) METHOD, MEDIUM, AND SYSTEM ENCODING/DECODING VIDEO DATA USING BITRATE ADAPTIVE BINARY ARITHMETIC CODING

(75) Inventors: Wooshik Kim, Yongin-si (KR); Hyun Mun Kim, Seongnam-si (KR); Daesung Cho, Seoul (KR); Dmitri Birinov, Yongin-si (KR); Doohyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2039 days.

(21) Appl. No.: 11/490,021

(22) Filed: Jul. 21, 2006

(65) Prior Publication Data

US 2007/0171985 A1 Jul. 26, 2007

(30) Foreign Application Priority Data

Jul. 21, 2005 (KR) .................. 10-2005-0066351

(51) Int. Cl.
*H04N 7/12* (2006.01)

(52) U.S. Cl.
USPC ............. 375/240.23; 341/107; 375/240.26; 382/239

(58) Field of Classification Search
USPC ................... 375/240.26; 341/107
See application file for complete search history.

(56) References Cited

U.S. PATENT DOCUMENTS

| 5,444,800 | A * | 8/1995 | Kim et al. ............... 382/239 |
| 6,879,632 | B1 * | 4/2005 | Yokoyama ............ 375/240.13 |
| 6,900,748 | B2 * | 5/2005 | Marpe et al. ............ 341/107 |
| 7,079,057 | B2 * | 7/2006 | Kim et al. ............... 341/107 |
| 2006/0028359 | A1 * | 2/2006 | Kim et al. ............... 341/50 |

* cited by examiner

*Primary Examiner* — Jay Patel
*Assistant Examiner* — Jessica Prince
(74) *Attorney, Agent, or Firm* — Staas & Halsey LLP

(57) ABSTRACT

A method, medium, and system encoding/decoding video data using a binary arithmetic coding adaptive to a compression bit rate of the video data. The system may include a bitrate adaptation unit determining a maximum length of a prefix using a compression bitrate of the video data, a binarization unit dividing the video data into a prefix and a suffix according to the determined maximum length of the prefix and binarizing the video data, and an arithmetic encoding unit performing an arithmetic encoding on the binarized video data. The video data may be encoded/decoded using binary arithmetic encoding/decoding by determining the maximum length of the prefix, an order of an exponential Golomb code, and the number of contexts based on the compression bitrate. Accordingly, it is possible to obtain high encoding efficiency regardless of a range of the desired compression bitrate.

44 Claims, 7 Drawing Sheets

FIG. 1 (PRIOR ART)

| abs_level_minus1 | Bin string | | | | | | | | | | | | | | | | | | |
|---|---|---|---|---|---|---|---|---|---|---|---|---|---|---|---|---|---|---|---|
| | TU prefix | | | | | | | | | | | | | | EG0 suffix | | | | |
| 0 | 0 | | | | | | | | | | | | | | | | | | |
| 1 | 1 | 0 | | | | | | | | | | | | | | | | | |
| 2 | 1 | 1 | 0 | | | | | | | | | | | | | | | | |
| 3 | 1 | 1 | 1 | 0 | | | | | | | | | | | | | | | |
| ... | | | | | | | | | | | | | | | | | | | |
| 9 | 1 | 1 | 1 | 1 | 1 | 1 | 1 | 1 | 1 | 0 | | | | | | | | | |
| 10 | 1 | 1 | 1 | 1 | 1 | 1 | 1 | 1 | 1 | 1 | 0 | | | | | | | | |
| 11 | 1 | 1 | 1 | 1 | 1 | 1 | 1 | 1 | 1 | 1 | 1 | 0 | | | | | | | |
| 12 | 1 | 1 | 1 | 1 | 1 | 1 | 1 | 1 | 1 | 1 | 1 | 1 | 0 | | | | | | |
| 13 | 1 | 1 | 1 | 1 | 1 | 1 | 1 | 1 | 1 | 1 | 1 | 1 | 1 | 0 | | | | | |
| 14 | 1 | 1 | 1 | 1 | 1 | 1 | 1 | 1 | 1 | 1 | 1 | 1 | 1 | 1 | 0 | | | | |
| 15 | 1 | 1 | 1 | 1 | 1 | 1 | 1 | 1 | 1 | 1 | 1 | 1 | 1 | 1 | 1 | 0 | 0 | | |
| 16 | 1 | 1 | 1 | 1 | 1 | 1 | 1 | 1 | 1 | 1 | 1 | 1 | 1 | 1 | 1 | 0 | 1 | | |
| 17 | 1 | 1 | 1 | 1 | 1 | 1 | 1 | 1 | 1 | 1 | 1 | 1 | 1 | 1 | 1 | 1 | 0 | 0 | 0 |
| 18 | 1 | 1 | 1 | 1 | 1 | 1 | 1 | 1 | 1 | 1 | 1 | 1 | 1 | 1 | 1 | 1 | 0 | 0 | 1 |
| 19 | 1 | 1 | 1 | 1 | 1 | 1 | 1 | 1 | 1 | 1 | 1 | 1 | 1 | 1 | 1 | 1 | 0 | 1 | 0 |
| ... | | | | | | | | | | | | | | | | | | | |
| bin | 0 | 1 | 2 | 3 | 4 | 5 | 6 | 7 | 8 | 9 | 10 | 11 | 12 | 13 | 14 | 15 | 16 | 17 | 18 ... |

FIG. 3

| abs_level_minus1 | Bin string | | | | | | | | | | | | | | | | | | |
|---|---|---|---|---|---|---|---|---|---|---|---|---|---|---|---|---|---|---|---|
| | TU prefix | | | | | | | | | | EG0 suffix | | | | | | | | |
| 0 | 0 | | | | | | | | | | | | | | | | | | |
| 1 | 1 | 0 | | | | | | | | | | | | | | | | | |
| 2 | 1 | 1 | 0 | | | | | | | | | | | | | | | | |
| 3 | 1 | 1 | 1 | 0 | | | | | | | | | | | | | | | |
| ... | | | | | | | | | | | | | | | | | | | |
| 9 | 1 | 1 | 1 | 1 | 1 | 1 | 1 | 1 | 1 | 0 | | | | | | | | | |
| 10 | 1 | 1 | 1 | 1 | 1 | 1 | 1 | 1 | 1 | 1 | 0 | | | | | | | | |
| 11 | 1 | 1 | 1 | 1 | 1 | 1 | 1 | 1 | 1 | 1 | 1 | 0 | 0 | | | | | | |
| 12 | 1 | 1 | 1 | 1 | 1 | 1 | 1 | 1 | 1 | 1 | 1 | 0 | 1 | | | | | | |
| 13 | 1 | 1 | 1 | 1 | 1 | 1 | 1 | 1 | 1 | 1 | 1 | 1 | 0 | 0 | 0 | | | | |
| 14 | 1 | 1 | 1 | 1 | 1 | 1 | 1 | 1 | 1 | 1 | 1 | 1 | 0 | 0 | 1 | | | | |
| 15 | 1 | 1 | 1 | 1 | 1 | 1 | 1 | 1 | 1 | 1 | 1 | 1 | 0 | 1 | 0 | | | | |
| 16 | 1 | 1 | 1 | 1 | 1 | 1 | 1 | 1 | 1 | 1 | 1 | 1 | 0 | 1 | 1 | | | | |
| 17 | 1 | 1 | 1 | 1 | 1 | 1 | 1 | 1 | 1 | 1 | 1 | 1 | 1 | 0 | 0 | 0 | 0 | | |
| 18 | 1 | 1 | 1 | 1 | 1 | 1 | 1 | 1 | 1 | 1 | 1 | 1 | 1 | 0 | 0 | 0 | 1 | | |
| 19 | 1 | 1 | 1 | 1 | 1 | 1 | 1 | 1 | 1 | 1 | 1 | 1 | 1 | 0 | 0 | 1 | 0 | | |
| ... | | | | | | | | | | | | | | | | | | | |
| bin | 0 | 1 | 2 | 3 | 4 | 5 | 6 | 7 | 8 | 9 | 10 | 11 | 12 | 13 | 14 | 15 | 16 | 17 | 18 | ... |

FIG. 4

| abs_level_mi nus1 | Bin string | | | | | | | | | | | | | | | | | | | |
|---|---|---|---|---|---|---|---|---|---|---|---|---|---|---|---|---|---|---|---|---|
| | TU prefix | | | | | | | | | | | | | | EG2 | | | | | |
| 0 | 0 | | | | | | | | | | | | | | | | | | | |
| 1 | 1 | 0 | | | | | | | | | | | | | | | | | | |
| 2 | 1 | 1 | 0 | | | | | | | | | | | | | | | | | |
| 3 | 1 | 1 | 1 | 0 | | | | | | | | | | | | | | | | |
| ... | | | | | | | | | | | | | | | | | | | | |
| 9 | 1 | 1 | 1 | 1 | 1 | 1 | 1 | 1 | 1 | 0 | | | | | | | | | | |
| 10 | 1 | 1 | 1 | 1 | 1 | 1 | 1 | 1 | 1 | 1 | 0 | | | | | | | | | |
| 11 | 1 | 1 | 1 | 1 | 1 | 1 | 1 | 1 | 1 | 1 | 1 | 0 | | | | | | | | |
| 12 | 1 | 1 | 1 | 1 | 1 | 1 | 1 | 1 | 1 | 1 | 1 | 1 | 0 | | | | | | | |
| 13 | 1 | 1 | 1 | 1 | 1 | 1 | 1 | 1 | 1 | 1 | 1 | 1 | 1 | 0 | | | | | | |
| 14 | 1 | 1 | 1 | 1 | 1 | 1 | 1 | 1 | 1 | 1 | 1 | 1 | 1 | 1 | 0 | 0 | 0 | | | |
| 15 | 1 | 1 | 1 | 1 | 1 | 1 | 1 | 1 | 1 | 1 | 1 | 1 | 1 | 1 | 0 | 0 | 1 | | | |
| 16 | 1 | 1 | 1 | 1 | 1 | 1 | 1 | 1 | 1 | 1 | 1 | 1 | 1 | 1 | 0 | 1 | 0 | | | |
| 17 | 1 | 1 | 1 | 1 | 1 | 1 | 1 | 1 | 1 | 1 | 1 | 1 | 1 | 1 | 0 | 1 | 1 | | | |
| 18 | 1 | 1 | 1 | 1 | 1 | 1 | 1 | 1 | 1 | 1 | 1 | 1 | 1 | 1 | 1 | 0 | 0 | 0 | 0 | |
| 19 | 1 | 1 | 1 | 1 | 1 | 1 | 1 | 1 | 1 | 1 | 1 | 1 | 1 | 1 | 1 | 0 | 0 | 0 | 1 | |
| ... | | | | | | | | | | | | | | | | | | | | |
| bin | 0 | 1 | 2 | 3 | 4 | 5 | 6 | 7 | 8 | 9 | 10 | 11 | 12 | 13 | 14 | 15 | 16 | 17 | 18 | ... |

METHOD, MEDIUM, AND SYSTEM ENCODING/DECODING VIDEO DATA USING BITRATE ADAPTIVE BINARY ARITHMETIC CODING

CROSS-REFERENCE TO RELATED APPLICATIONS

This application claims the benefit of Korean Patent Application No. 10-2005-0066351, filed on Jul. 21, 2005, in the Korean Intellectual Property Office, the disclosure of which is incorporated herein in its entirety by reference.

BACKGROUND OF THE INVENTION

1. Field of the Invention

Embodiments of the present invention relate to a method, medium, and system encoding/decoding video data, and more particularly, to a method, medium, and system encoding/decoding video data using binary arithmetic coding adaptive to a compression bitrate of video data.

2. Description of the Related Art

Compression bitrates for encoding video data may be designated differently for various applications. For example, a high bitrate may be used in a high quality application, such as in DVDs, to minimize losses that affect quality, while a low bitrate with lossy compression may be used in applications such as mobile devices due to bandwidth limitations.

Typically, entropy coding is used to compress generated data by using various kinds of coding methods and to produce a bit stream. As a representative coding method, Huffman coding is widely used. Recently, there has been development of a coding standard called H.264/AVC, ITU-T Recommendation H.264 and ISO/IEC 14496-10, MPEG-4 part 10, Advanced Video Coding, as developed by Joint Video Team (JVT), consisting of ISO/IEC MPEG and ITU-T VCEG. This standard allows a user to selectively use one of Huffman coding and arithmetic coding when a bit stream is created. Although the arithmetic coding has a higher complexity in comparison with the Huffman coding, it has an advantage in that it has a high compression rate by generating codes according to a statistical characteristic of given data.

In the H.264/AVC standard, given symbols are binarized and then the arithmetic coding is performed for the binarized symbols in order to increase coding efficiency. In addition, when the binarization is performed, various binarization methods are selectively used according to a classification of the symbols to increase a compression rate.

FIG. 1 illustrates an example of binarizing quantization coefficients according to such an H.264/AVC standard. The quantized transformation coefficients are binarized using a value of "abs_level_minus1," obtained by subtracting 1 from each original coefficient. When the value of abs_level_minus1 is less than 14, each coefficient is mapped to a truncated unary (TU) code consisting of a continuation of "1" bits and terminating with a "0" bit. On the other hand, when the value of abs_level_minus1 is equal to or larger than 14, each prefix part less than 14 is mapped to a TU code, and the remaining suffix part equal to or larger than 14 is mapped to an exponential Golomb code having an order of "0". In this method, different binarization methods are used depending on the magnitude of the coefficient, in order to adaptively apply a higher probability to smaller values that occur more frequently in the binarization and significantly increase arithmetic coding efficiency.

However, the probability distribution of quantization coefficients differs depending on compression bitrates. Since a maximum length of the prefix and an order of the exponential Golomb code are fixed in the current H.264/AVC standard, as mentioned above, prediction cannot be adaptively performed for a practical probability.

A context-based adaptive binary arithmetic coding is adopted in the H.264/AVC standard. In this method, a different context is extracted depending on conditions of other neighboring symbols when a certain symbol is decoded, and a probability is adaptively given to it in order to improve compression efficiency. In the H.264/AVC, the context for quantized coefficients is established using the number of certain decoded coefficients. The extracted context includes two factors, a state value (State) and Most Probability Symbol (MPS), with both the State and MPS representing information on probability characteristics. The context for quantized coefficients consists of a total of 10 pieces, including 5 pieces for a first binary number of the binarized value and 5 pieces for the remaining binary number. A current probability is predicted from 10 pieces of the context depending on conditions of neighboring binary numbers to perform the encoding/decoding.

SUMMARY OF THE INVENTION

Embodiments of the present invention provide a method, medium, and system encoding/decoding video data using a binary arithmetic coding adaptive to a compression bit rate of the video data.

Additional aspects and/or advantages of the invention will be set forth in part in the description which follows and, in part, will be apparent from the description, or may be learned by practice of the invention.

To achieve the above and/or other aspects and advantages, embodiments of the present invention include a system encoding video data using binary arithmetic coding, the system including a bitrate adaptation unit to determine a maximum length of a prefix for the video data using a compression bitrate of the video data, a binarization unit to divide the video data into a prefix and a suffix according to the determined maximum length of the prefix and to binarize the video data, and an arithmetic encoding unit to perform arithmetic encoding on the binarized video data.

The compression bitrate of the video data may be determined using a quantization step size. In addition, the compression bitrate of the video data may be determined using a bitrate of data encoded for a previous video data.

Further, the compression bitrate of the video data may be determined using a bitrate of data encoded for a previous macroblock. Still further, the compression bitrate of the video data may be determined using a number of bits included in data binarized for a previous video data.

The compression bitrate of the video data may be determined using a number of bits included in data binarized for a previous macroblock.

In addition, the bitrate adaptation unit may determine the maximum length of the prefix according to the maximum length of the prefix being in inverse proportion to the compression bitrate.

The binarization unit may further binarize the video data before the determined maximum length of the prefix is binarized, using a truncated unary (TU) code.

The binarization unit may further binarize video data, remaining after the determined maximum length of the prefix is binarized, using an exponential Golomb code. Here, the bitrate adaptation unit may determine an order of the exponential Golomb code according to the order of the exponential Golomb code being in proportion to the compression bitrate.

In addition, the system may further include a context selection unit to select one of a plurality of contexts having information on a probability distribution of the video data, wherein the arithmetic encoding unit performs arithmetic encoding on the binarized video data using the one selected context. Here, the bitrate adaptation unit may use a determined number of the plurality of contexts according to the number of the plurality of contexts being in proportion to the compression bitrate of the video data.

To achieve the above and/or other aspects and advantages, embodiments of the present invention include a system encoding video data using binary arithmetic coding, the system including a bitrate adaptation unit to determine an exponential Golomb code order for the video data using a compression bitrate of the video data, a binarization unit to binarize the video data using an exponential Golomb code having the determined exponential Golomb code order, and an arithmetic encoding unit to perform arithmetic encoding on the binarized video data.

To achieve the above and/or other aspects and advantages, embodiments of the present invention include a system encoding video data using binary arithmetic coding, the system including a bitrate adaptation unit to determine a number of a plurality of contexts having information on a probability distribution of the video data based on a compression bitrate of the video data, a context selection unit to select one of the plurality of contexts, and an arithmetic encoding unit to perform arithmetic encoding on binarized video data using the selected one context.

To achieve the above and/or other aspects and advantages, embodiments of the present invention include a system receiving a bit stream and decoding video data, the system including an arithmetic decoding unit to perform arithmetic decoding on the video data, a bitrate adaptation unit to determine a maximum length of a prefix for the video data using a compression bitrate of the video data, and an inverse binarization unit to divide decoded video data into a prefix and a suffix according to the determined maximum length of the prefix and to perform an inverse binarization for the decoded video data.

To achieve the above and/or other aspects and advantages, embodiments of the present invention include a system receiving a bit stream and decoding video data, the system including an arithmetic decoding unit to perform arithmetic decoding on the video data, a bitrate adaptation unit to determine an order of an exponential Golomb code for the video data using a compression bitrate of the video data, and an inverse binarization unit to perform inverse binarization on the exponential Golomb code, included in the video data, according to the determined order.

To achieve the above and/or other aspects and advantages, embodiments of the present invention include a system receiving a bit stream and decoding video data, the system including a bitrate adaptation unit to determine a number of a plurality of contexts having information on a probability distribution of the video data using a compression bitrate of the video data, a context selection unit to select one of the plurality of contexts, and an arithmetic decoding unit to perform arithmetic decoding on the video data using the one selected context.

To achieve the above and/or other aspects and advantages, embodiments of the present invention include a method of binary arithmetic decoding video data, the method including determining a maximum length of a prefix for the video data using a compression bitrate of the video data, binarizing the video data by dividing the video data into a prefix and a suffix according to the determined maximum length of the prefix, and performing arithmetic encoding on the binarized video data.

The compression bitrate of the video data may be determined using a quantization step size. In addition, the maximum length of the prefix may be determined using a bitrate of data encoded for a previous video data.

The maximum length of the prefix may be determined using a bitrate of data encoded for a previous macroblock. Further, the maximum length of the prefix may be determined using a number of bits included in data binarized for a previous video data.

The maximum length of the prefix may also be determined using a number of bits included in data binarized for a previous macroblock. In addition, the maximum length of the prefix may be determined according to the maximum length of the prefix being in inverse proportion to the compression bitrate.

The video data may be binarized before the determined maximum length of the prefix is binarized, using a truncated unary (TU) code. Further, the video data may be binarized after the determined maximum length of the prefix is binarized, using an exponential Golomb code.

Further, an order of the exponential Golomb code may be determined according to the order of the exponential Golomb code being in proportion to the compression bitrate.

In addition, the method may include selecting one of a plurality of contexts having information on a probability distribution of the video data. Here, a number of the plurality of contexts may be determined according to the number of the plurality of the contexts being in proportion to a compression bitrate of the video data.

To achieve the above and/or other aspects and advantages, embodiments of the present invention include a method of encoding video data using binary arithmetic coding, the method including determining an exponential Golomb code order for the video data using a compression bitrate of the video data, binarizing the video data using an exponential Golomb code having the determined exponential Golomb code order, and performing arithmetic encoding on the binarized video data.

To achieve the above and/or other aspects and advantages, embodiments of the present invention include a method of encoding video data using binary arithmetic coding, the method including determining a number of a plurality of contexts having information on a probability distribution of the video data according to a compression bitrate of the video data, selecting one of the plurality of contexts, and performing arithmetic encoding on the binarized video data using the one selected context.

To achieve the above and/or other aspects and advantages, embodiments of the present invention include a method of decoding video data included in a bit stream, the method including performing arithmetic decoding on the video data, determining a maximum length of a prefix for the video data using a compression bitrate of the video data, and performing inverse binarization on the decoded video data by dividing the decoded video data into a prefix and a suffix based on the determined maximum length of the prefix.

To achieve the above and/or other aspects and advantages, embodiments of the present invention include a method of decoding video data included in a bit stream, the method including performing arithmetic decoding on the video data, determining an order of an exponential Golomb code for the video data using a compression bitrate of the video data, and performing inverse binarization on the exponential Golomb code, included in the video data, according to the determined order.

To achieve the above and/or other aspects and advantages, embodiments of the present invention include a method of decoding video data included in a bit stream, the method including determining a number of a plurality of contexts having information on a probability distribution of the video data using a compression bitrate of the video data, selecting one of the plurality of contexts, and performing arithmetic decoding on the video data using the selected one context.

To achieve the above and/or other aspects and advantages, embodiments of the present invention include a medium including computer readable code to implement embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 illustrates a binary code table describing a conventional video data binarizing method;

FIG. 3 illustrates a binary code table describing a method determining a maximum length of a prefix according to a bitrate and binarizing image data, according to an embodiment of the present invention;

FIG. 4 illustrates a binary code table describing a method determining an order of an exponential Golomb code according to a bitrate and binarizing video data, according to an embodiment of the present invention;

DETAILED DESCRIPTION OF THE PREFERRED EMBODIMENTS

Figure 2:
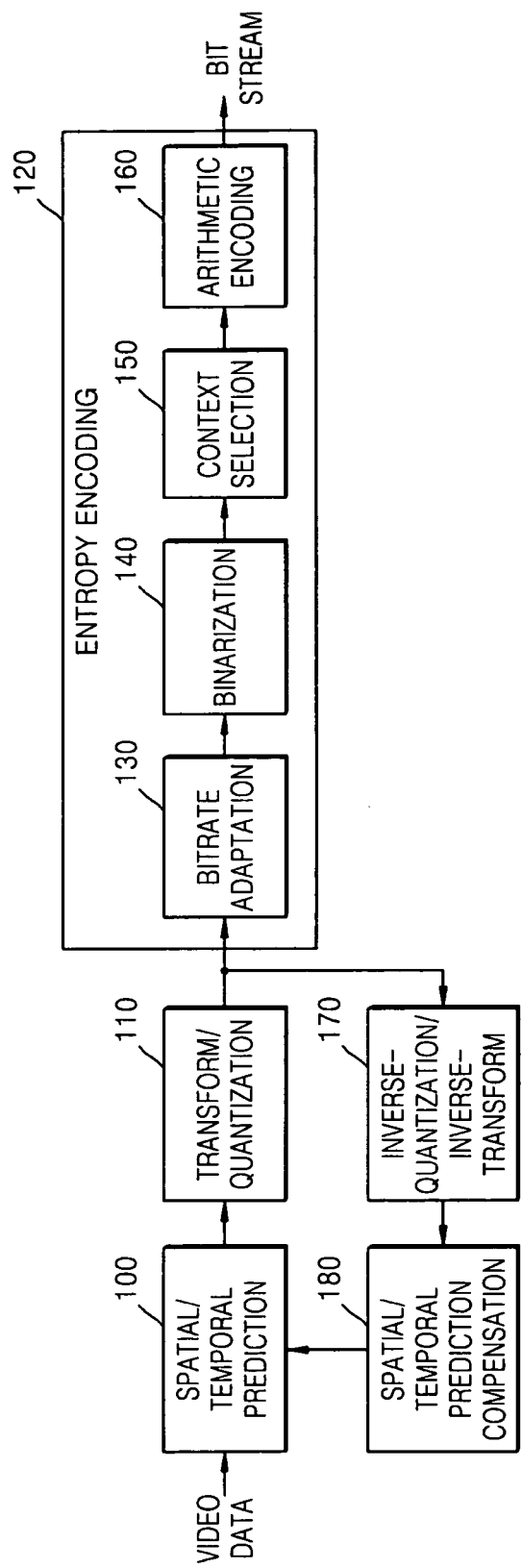
FIG. 2 illustrates a system encoding image data using bitrate adaptive coding, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 2 illustrates a system encoding video data using bitrate adaptive binary arithmetic coding, according to an embodiment of the present invention. The encoder may include a spatial/temporal prediction unit 100, a transform/quantization unit 110, an entropy encoding unit 120, an inverse-quantization/inverse-transform unit 170, and a spatial/temporal prediction compensation unit 180, for example. The entropy encoding unit 120 may also include a bitrate adaptation unit 130, a binarization unit 140, a context selection unit 150, and an arithmetic encoding unit 160, for example.

Below, example operations of the encoder shown in FIG. 2, according to embodiments of the present invention, will be described below with reference to FIG. 5, a flowchart illustrating an encoding of video data according to an embodiment of the present invention.

Figure 5:
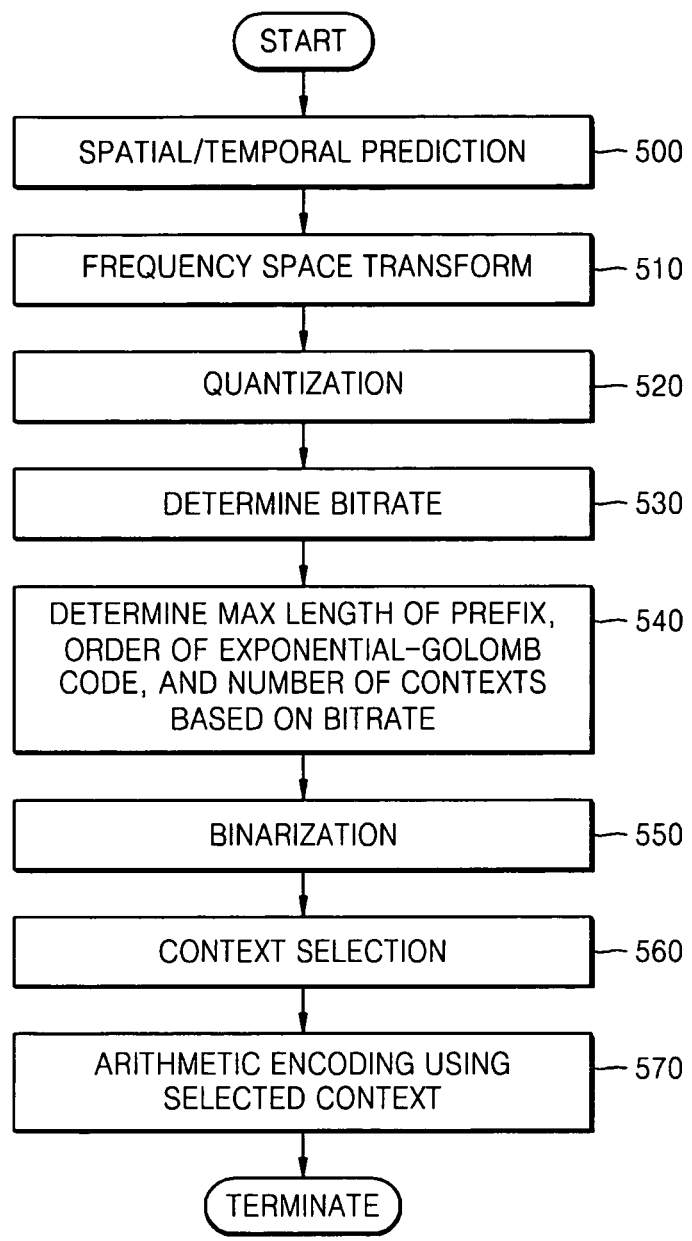
FIG. 5 illustrates a method of encoding video data using bitrate adaptive coding, according to an embodiment of the present invention.

As illustrated in FIG. 5, in operation 500, an inter prediction mode may be performed in such a way that the spatial/temporal prediction unit 100, for example, extracts a block similar to an encoding target block and included in a previous picture, e.g., as restored in the spatial/temporal prediction compensation unit 180, for example, and then, a difference between a block pixel value of the extracted previous picture and a block pixel value of a current picture is encoded for temporal prediction. Conversely, an intra prediction mode may be performed in such a way that the spatial/temporal prediction unit 100, for example, extracts a block similar to an encoding target block and from the restored current picture, and then, a difference between a pixel value of the extracted block and a pixel value of the current block is encoded for spatial prediction.

In operation 510, the transform/quantization unit 110, for example, may perform a frequency space transform, e.g., a discrete cosine transform (DCT), a Hadamard transform, or an integer transform, on the data predicted in the spatial/temporal prediction. Then, in operation 520, the transformed data may be quantized to output quantized transform coefficients. As an example, the entropy encoding unit 120 may then perform binary arithmetic coding on symbols of the quantized transform coefficients, motion-vectors output from the spatial/temporal prediction unit 110, and additional information to produce a bit stream. The binary arithmetic coding of the entropy encoding unit 120 will now be described in greater detail.

In operation 540, the bitrate adaptation unit 130, for example, may determine an order of an exponential Golomb code and a maximum length of the prefix that will be used in binarization, as performed in operation 550, based on a compression bitrate required in the encoder, and the number of the contexts that will be selected in the context selection, as performed in operation 560.

In this case, the compression bitrate may preferably be, for example, obtained from a quantization step size (QP) used in quantization, as performed in operation 510. The compression bitrate is inversely proportional to the quantization step size. Therefore, it may be preferable that a reference quantization step size be previously established, and then, the bitrate adaptation unit 130 may determine that a bitrate is relatively large if the quantization step size used in the quantization, as performed in operation 510, is smaller than the reference quantization step size, and therefore the maximum prefix length, the order of the exponential Golomb code, and the number of contexts that are established for a high bitrate are selected. Conversely, the bitrate adaptation unit 130 may determine that the bitrate is relatively low if the quantization step size used in the quantization, as performed in operation 510, is larger than the reference quantization step size, and therefore the maximum prefix length, the order of the exponential Golomb code, and the number of the contexts that are established for a low bitrate may be selected.

In an embodiment, the compression bitrate may be computed by accumulating the amount of bits encoded for previous pictures or macroblocks or the number of bins binarized for previous pictures or macroblocks for a predetermined time period.

Since a high bitrate requires a number of binarization levels for the quantization transform coefficient, efficiency may be degraded if a truncated unary (TU) code in which a shorter code is given to a smaller value is used. Therefore, it may be preferable that the maximum length of the prefix, functioning as a reference value for binarizing the coefficients using a TU code, is reduced as the bitrate is higher. In other words, the maximum length of the prefix may preferably be, for example, determined so as to be inversely proportional to the bitrate.

The TU code may be obtained by binarizing a level value x into a binary number having x "1" digits and a "0" digit. The TU code may only be defined for x with 0≤x≤S, for example, where for x<S the code is given by the TU code, whereas for x=S the terminating "0" bit may be neglected and a "1" bit may be used instead.

The exponential Golomb code includes a prefix part and a suffix part. The prefix part includes a TU code corresponding to the value of l(x), e.g., according to the following Equation 1.

$$l(x)=\log_2(x/2^k+1)$$                 Equation 1:

Here, x corresponds to a binarization target value, and k corresponds to an order of the exponential Golomb code.

The suffix part is a binary code corresponding to the value of m(x), e.g., according to the following Equation 2.

$$m(x)=x+2^k(1-2^{l(x)})$$                Equation 2:

Here, the binary code of the value of m(x) has k+l(x) significant bits.

Assuming that a decimal number "2" is binarized using the exponential Golomb code having an order of "0", the value of l(x) is "1", so that the prefix part becomes "10", corresponding to a unary code of "1". Also, the value of m(x) is "1", so that the suffix part becomes "1", which corresponds to a binary code of one bit.

If the bitrate is relatively low, most of the binarization target data is distributed near the value of "0". Therefore, the probability of producing a certain value becomes higher, and the exponential Golomb code may preferably have a lower order (k). If the bitrate is relatively high, the probability of producing a certain value becomes lower, and the exponential Golomb code may preferably have a higher order. Accordingly, the bitrate adaptation unit 130 may preferably determine an order of the exponential Golomb code in proportion to the bitrate.

When the probability distribution of the current encoding target symbol is influenced by M previous symbols, context refers to the aforementioned M symbols, and the number of contexts refers to the number M of the previous symbols influencing the probability distribution of the current symbols. As the number of previous symbols influencing the probability distribution of the current symbol increases (i.e., as the number of the contexts increases), a probability prediction becomes complicated. Conversely, as the number of contexts is reduced, the probability prediction becomes inaccurate. Therefore, it may be preferable that the bitrate adaptation unit 130, for example, increase the number of contexts when the bitrate is high and reduce the number of contexts when the bitrate is low.

In operation 550, the binarization unit 140, for example, may perform binarization on the quantization transform coefficients using the order of the determined exponential Golomb code and a determined maximum length of the prefix.

FIG. 3 illustrates a method determining the maximum length of the prefix, according to the bitrate, and binarizing the determined maximum length of the prefix, according to an embodiment of the present invention. In this case, the values of the aforementioned abs_level_minus1, obtained by subtracting 1 from the quantized transform coefficients, are binarized. In the aforementioned conventional H.264/AVC standard, the maximum length of the prefix, to be binarized using a TU code, is fixed to 13 bins, as shown in FIG. 1. Conversely, according to an embodiment of the present invention, the maximum length of the prefix may be reduced to 9 bins, as shown in FIG. 3, as the bitrate adaptation unit 130, for example, determines that the bitrate is relatively high. Here, based on such a maximum length of the prefix being determined to be 9 bins, the prefix part smaller than 10 bins may be binarized using a TU code, and the suffix part equal to or larger than 10 bins may be binarized using an exponential Golomb code having an order of "0".

Further, FIG. 4 illustrates a method binarizing a quantization transform coefficient abs_level_minus1 by determining an order k of an exponential Golomb code based on the bitrate, according to an embodiment of the present invention. In this case, the bitrate adaptation unit 130, for example, may determine that the bitrate is relatively high, and increase the order k to "2". Based on the increased order, the prefix part smaller than 14 bins may be binarized using a TU code, and the suffix part equal to or larger than 14 bins may be binarized using an exponential Golomb code having an order of "2", for example. With the above embodiments, embodiments of the present invention are not limited thereto and alternative embodiments are equally available.

In operation 560 of FIG. 5, the context selection unit 150, for example, may select one of the contexts, the number of which is determined based on the bitrate. A method of selecting the context, e.g., by the context selection unit 150, will now be described in greater detail by exemplifying an example where the quantization transform coefficients are binarized using a binary arithmetic coding, for example.

When a current encoding target value is a first binary number of the binarized data, the context selection unit 150 may perform a context selection according to the following Equation 3.

$$ctxIdx=((\text{numDecodAbsLevelGt1}!=0)?\ 0:\text{Min}(N,1+\text{numDecodAbsLevelEq1})),$$                Equation 3:

Here, ctxIdx corresponds to the selected context, numDecodAbsLevelGt1 corresponds to the number of the quantization transform coefficients which are larger than "1" and previously decoded, numDecodAbsLevelEq1 corresponds to the number of quantization transform coefficients that have a value of "1" and have been previously decoded, and N corresponds to the number of contexts for the first binary number.

When the current encoding target value is not the first binary number, the context selection unit 150 may select the context according to the following Equation 4.

$$ctxIdx=N+\text{Min}(M,\text{numDecodAbsLevelGt1}),$$                Equation 4:

Here, M corresponds to the number of contexts for the remaining binary numbers other than the first binary number.

In operation 570, the arithmetic encoding unit 160, for example, performs an arithmetic coding for the data output from the binarization unit 140, for example, using the probability distribution of the selected context. The arithmetic encoding will now be described below by exemplifying an example embodiment where the arithmetic encoding is performed for a multiplication value $S_1S_3S_2S_4$ of four symbols $S_1$, $S_2$, $S_3$, and $S_4$ having probabilities 0.2, 0.4, 0.3, 0.1, respectively, noting that these probabilities are only examples.

Intervals of four symbols may be scaled to intervals between 0 and 1 according to the probability distribution. Specifically, the four symbols $S_1$, $S_2$, $S_3$, and $S_4$ may be scaled to intervals [0.0, 0.2], [0.2, 0.6], [0.6, 0.9], and [0.9, 1.0], respectively.

The entire interval [0.0, 1.0] may be rescaled to the interval [0.0, 0.2] to which the first symbol $S_1$ was scaled. Similarly, for the rescaled interval [0.0, 0.2], the second symbol $S_2$ may be rescaled to an interval [0.12, 0.18], for the rescaled interval [0.12, 0.18], the third symbol $S_3$ may be rescaled to an interval [0.132, 0.156], and for the rescaled interval [0.132, 0.156], the last symbol $S_4$ may be rescaled to an interval [0.1536, 0.156].

As a result, the multiplication data $S_1S_3S_2S_4$ may be encoded to a predetermined value belonging to the last rescaled interval [0.1536, 0.156]. For example, the arithmetic encoding unit 160 may encode the multiplication data $S_1S_3S_2S_4$ to 0.154, for example, included in the interval [0.1536, 0.156].

Figure 6:
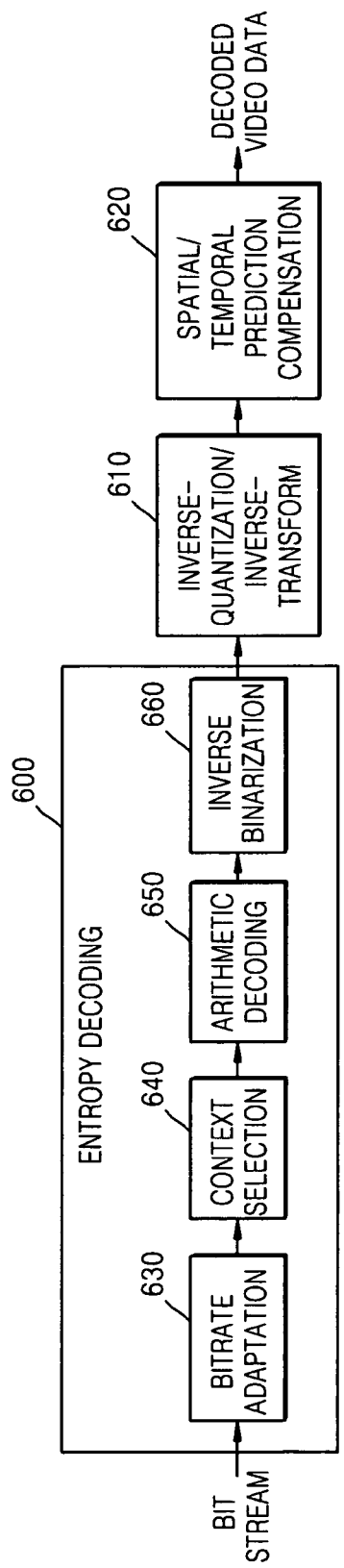
FIG. 6 illustrates a system decoding video data using bitrate adaptive coding, according to an embodiment of the present invention.
Figure 7:
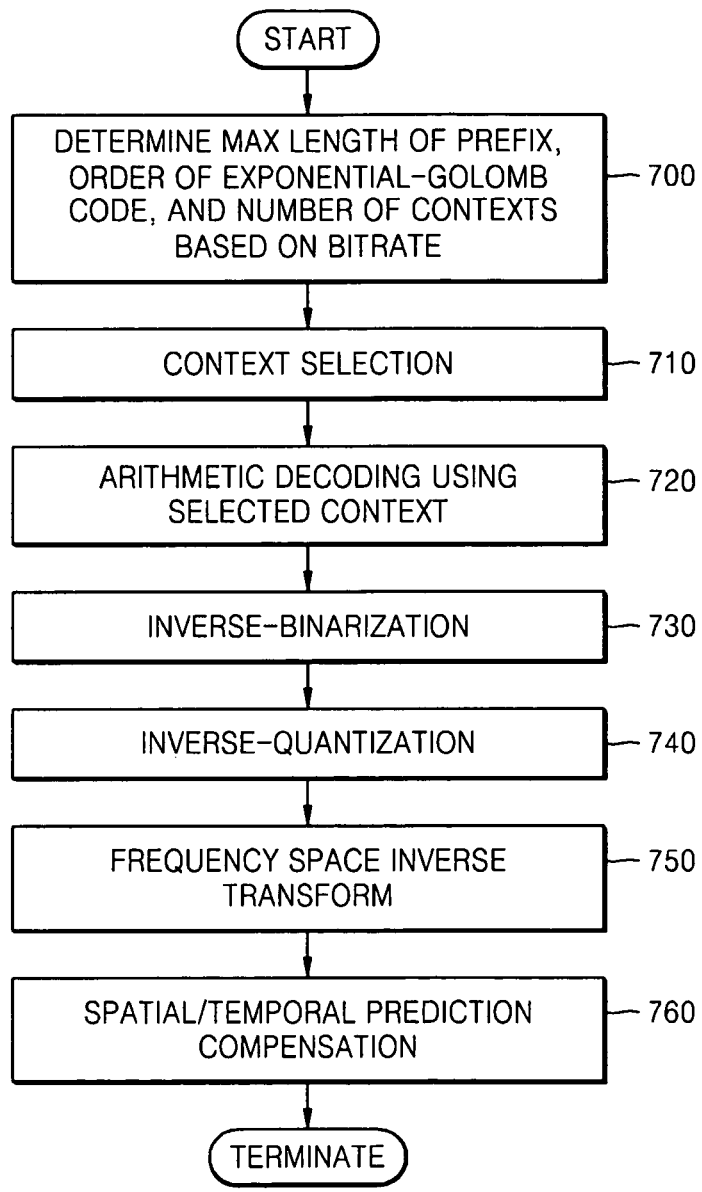
FIG. 7 illustrates a method decoding image data using bitrate adaptive coding, according to an embodiment of the present invention.

FIG. 6 illustrates a system decoding video data using bitrate adaptive binary arithmetic coding, according to an embodiment of the present invention. The system may include an entropy decoding unit 600, an inverse-quantization/inverse-transform unit 610, and a spatial/temporal prediction compensation unit 620, for example. The entropy decoding unit 600 may further include a bitrate adaptation unit 630, a context selection unit 640, an arithmetic decoding unit 650, and an inverse-binarization unit 660, for example. An example operation of such a system, according to an embodiment of the present invention, will now be described below in greater detail with reference to FIG. 7, which shows a method decoding video data according to an embodiment of the present invention.

The entropy decoding unit 600 may decompose the input bit stream to extract encoding information and encoded video data. Hereinafter, operations of the entropy decoding unit 600 will be described in more detail.

In operation 700, the bitrate adaptation unit 630, for example, may detect the bitrate of current decoding target data from the input bitrate, and determine the maximum length of the prefix, an order of an exponential Golomb code, and the number of the contexts based on the detected bitrate, for example. In order to detect the bitrate, it may be preferable to use a quantization step size (e.g., a quantization coefficient (QP)) included in the bit stream, an amount of bits accumulated for a predetermined time period by decoding the previous picture or macroblock, and a number of bins produced by performing an inverse binarization for the previous picture or macroblock, for example. Here, such a method of determining the above values, e.g., by the bitrate adaptation unit 630, is similar to the aforementioned determining of the values by the bitrate adaptation unit 130, for example.

In operation 710, the context selection unit 640 may select one of the contexts having the determined number, while in operation 720, the arithmetic decoding unit 650, for example, may perform arithmetic encoding on the selected context. In operation 730, the inverse binarization unit 660, for example, may further perform inverse binarization on the data decoded using arithmetic decoding based on the maximum length of the prefix and the order of the exponential Golomb code that have been determined.

In operation 740, the inverse-quantization/inverse-transform unit 610 may perform an inverse quantization on the data binarized using the inverse-binarization. In operation 750, a frequency space inverse transform, such as an inverse discrete cosine transform (IDCT), may then be performed.

In operation 760, the spatial/temporal prediction compensation unit 760, for example, may compensate for the frequency space prediction of the data transformed using the frequency space inverse transform by referring to a restored previous picture in order to restore the original video data.

In the aforementioned method discussed in FIG. 2, the bitrate adaptation unit 130 may directly receive the maximum length of the prefix, the order of the exponential Golomb code, and the number of contexts determined based on the bitrate from a user. In an embodiment, when the above values are directly input by a user, for example, the above input values, thus, should be included in the bit stream produced by the entropy encoding unit 120. In this embodiment, these above values as included in the input bit stream may further be used when the context selection unit 640 selects the context and the inverse-binarization unit 660 performs the inverse binarization, for example.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion.

According to a method, medium, and system decoding/encoding video data using bitrate adaptive binary arithmetic coding, a maximum length of the prefix, an order of the exponential Golomb code, and a number of contexts may be determined based on a compression bitrate of the video data. Accordingly, with such embodiments, it is possible to obtain high encoding efficiency regardless of the range of the desired compression bitrate.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system encoding video data using binary arithmetic coding, the system comprising:
   a bitrate adaptation unit to determine a maximum length of a prefix for the video data using a compression bitrate of the video data;
   a binarization unit to divide the video data into a prefix and a suffix according to the determined maximum length of the prefix and to binarize the video data; and
   an arithmetic encoding unit to perform arithmetic encoding on the binarized video data,
   wherein the bitrate adaptation unit determines the maximum length of the prefix according to the maximum length of the prefix being in inverse proportion to the compression bitrate.

2. The system of claim 1, wherein the compression bitrate of the video data is determined using a quantization step size.

3. The system of claim 1, wherein the compression bitrate of the video data is determined using a bitrate of data encoded for a previous video data.

4. The system of claim 1, wherein the compression bitrate of the video data is determined using a bitrate of data encoded for a previous macroblock.

5. The system of claim 1, wherein the compression bitrate of the video data is determined using a number of bits included in data binarized for a previous video data.

6. The system of claim 1, wherein the compression bitrate of the video data is determined using a number of bits included in data binarized for a previous macroblock.

7. The system of claim 1, wherein the binarization unit binarizes the video data before the determined maximum length of the prefix is binarized, using a truncated unary (TU) code.

8. The system of claim 1, wherein the binarization unit binarizes video data, remaining after the determined maximum length of the prefix is binarized, using an exponential Golomb code.

9. The system of claim 8, wherein the bitrate adaptation unit determines an order of the exponential Golomb code according to the order of the exponential Golomb code being in proportion to the compression bitrate.

10. The system of claim 1, further comprising a context selection unit to select one of a plurality of contexts having information on a probability distribution of the video data, wherein the arithmetic encoding unit performs arithmetic encoding on the binarized video data using the one selected context.

11. The system of claim 10, wherein the bitrate adaptation unit uses a determined number of the plurality of contexts according to the number of the plurality of contexts being in proportion to the compression bitrate of the video data.

12. A system receiving a bit stream and decoding video data, the system comprising:
   an arithmetic decoding unit to perform arithmetic decoding on the video data;
   a bitrate adaptation unit to determine a maximum length of a prefix for the video data using a compression bitrate of the video data; and
   an inverse binarization unit to divide decoded video data into a prefix and a suffix according to the determined maximum length of the prefix and to perform an inverse binarization for the decoded video data,
   wherein the bitrate adaptation unit determines the maximum length of the prefix according to the maximum length of the prefix being in inverse proportion to the compression bitrate.

13. The system of claim 12, wherein the compression bitrate of the video data is determined using a quantization step size included in the bit stream.

14. The system of claim 12, wherein the compression bitrate of the video data is determined using a bitrate of decoded video data for a previous video data.

15. The system of claim 12, wherein the compression bitrate of the video data is determined using a bitrate of decoded data for a previous macroblock.

16. The system of claim 12, wherein the compression bitrate of the video data is determined based on a number of bits included in inversely binarized data for a previous video data.

17. The system of claim 12, wherein the compression bitrate of the video data is determined based on a number of bits included in inversely binarized data for a previous macroblock.

18. The system of claim 12, wherein inversely-binarized data includes truncated unary (TU) codes before information of the determined maximum length of the prefix, and with exponential Golomb codes being after information of the determined maximum length of the prefix.

19. The system of claim 18, wherein the bitrate adaptation unit determines an order of the exponential Golomb code according to the order of the exponential Golomb code being in proportion to the compression bitrate.

20. The system of claim 12, further comprising a context selection unit to select one of a plurality of contexts having information on a probability distribution of the video data,
   wherein the arithmetic decoding unit performs arithmetic decoding on the video data using the one selected context.

21. The system of claim 20, wherein the bitrate adaptation unit determines a number of the plurality of contexts according to the number of the plurality of contexts being in proportion to the compression bitrate of the video data.

22. A method of binary arithmetic decoding video data, the method comprising:
   determining a maximum length of a prefix for the video data using a compression bitrate of the video data;
   binarizing the video data by dividing the video data into a prefix and a suffix according to the determined maximum length of the prefix; and
   performing arithmetic encoding on the binarized video data,
   wherein the maximum length of the prefix is determined according to the maximum length of the prefix being in inverse proportion to the compression bitrate.

23. The method of claim 22, wherein a compression bitrate of the video data is determined using a quantization step size.

24. The method of claim 22, wherein the maximum length of the prefix is determined using a bitrate of data encoded for a previous video data.

25. The method of claim 22, wherein the maximum length of the prefix is determined using a bitrate of data encoded for a previous macroblock.

26. The method of claim 22, wherein the maximum length of the prefix is determined using a number of bits included in data binarized for a previous video data.

27. The method of claim 22, wherein the maximum length of the prefix is determined using a number of bits included in data binarized for a previous macroblock.

28. The method of claim 22, wherein the video data is binarized before the determined maximum length of the prefix is binarized, using a truncated unary (TU) code.

29. The method of claim 22, wherein the video data is binarized after the determined maximum length of the prefix is binarized, using an exponential Golomb code.

30. The method of claim 29, wherein an order of the exponential Golomb code is determined according to the order of the exponential Golomb code being in proportion to the compression bitrate.

31. The method of claim 22, further comprising selecting one of a plurality of contexts having information on a probability distribution of the video data.

32. The method of claim 31, wherein a number of the plurality of contexts is determined according to the number of the plurality of the contexts being in proportion to a compression bitrate of the video data.

33. A method of decoding video data included in a bit stream, the method comprising:
   performing arithmetic decoding on the video data;
   determining a maximum length of a prefix for the video data using a compression bitrate of the video data; and
   performing inverse binarization on the decoded video data by dividing the decoded video data into a prefix and a suffix based on the determined maximum length of the prefix,
   wherein the maximum length of the prefix is determined according to the maximum length of the prefix being in inverse proportion to the compression bitrate.

34. The method of claim 33, wherein the compression bitrate of the video data is determined using a quantization step size included in the bit stream.

35. The method of claim 33, wherein the compression bitrate of the video data is determined using a bitrate of decoded data for a previous video data.

36. The method of claim 33, wherein the compression bitrate of the video data is determined using a bitrate of decoded data for a previous macroblock.

37. The method of claim 33, wherein the compression bitrate of the video data is determined based on a number of bits included in inversely binarized data for a previous video data.

38. The method of claim 33, wherein the compression bitrate of the video data is determined using a number of bits included in inversely binarized data for a previous macroblock.

39. The method of claim 33, wherein inversely-binarized data includes truncated unary (TU) codes before information of the determined maximum length of the prefix, and with information of exponential Golomb codes being after information of the determined maximum length of the prefix.

40. The method of claim 39, wherein an order of the exponential Golomb code is in proportion to the determined compression bitrate.

41. The method of claim 33, further comprising selecting one of a plurality of contexts having information on a probability distribution of the video data.

42. The method of claim 41, wherein a number of the plurality of contexts is in proportion to a compression bitrate of the video data.

43. A non-transitory computer readable medium comprising computer readable code to implement a method of encoding video data using binary arithmetic coding, the method comprising:

determining a maximum length of a prefix for the video data using a compression bitrate of the video data;

binarizing the video data by dividing the video data into a prefix and a suffix according to the determined maximum length of the prefix; and performing arithmetic encoding on the binarized video data, wherein the maximum length of the prefix is determined according to the maximum length of the prefix being in inverse proportion to the compression bitrate.

44. A non-transitory computer readable medium comprising computer readable code to implement a method of decoding video data included in a bit stream, the method comprising:

performing arithmetic decoding on the video data;

determining a maximum length of a prefix for the video data using a compression bitrate of the video data; and performing inverse binarization on the decoded video data by dividing the decoded video data into a prefix and a suffix according to the maximum length of the prefix, wherein the maximum length of the prefix is determined according to the maximum length of the prefix being in inverse proportion to the compression bitrate.

* * * * *